(12) United States Patent
Lo

(10) Patent No.: US 11,573,421 B2
(45) Date of Patent: Feb. 7, 2023

(54) LIGHT FIELD NEAR EYE DISPLAY DEVICE

(71) Applicant: Coretronic Corporation, Hsin-Chu (TW)

(72) Inventor: Hsin-Hsiang Lo, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 259 days.

(21) Appl. No.: 17/115,802

(22) Filed: Dec. 9, 2020

(65) Prior Publication Data

US 2021/0191128 A1    Jun. 24, 2021

Related U.S. Application Data

(60) Provisional application No. 62/950,109, filed on Dec. 19, 2019.

(30) Foreign Application Priority Data

Jul. 15, 2020  (CN) .......................... 202010679341.1

(51) Int. Cl.
    *G02B 27/01*     (2006.01)
    *G02B 3/00*     (2006.01)
    *G02B 3/04*     (2006.01)

(52) U.S. Cl.
    CPC ....... *G02B 27/0172* (2013.01); *G02B 3/0056* (2013.01); *G02B 3/04* (2013.01)

(58) Field of Classification Search
    CPC ............ G02B 27/0172; G02B 27/0101; G02B 27/0178; G02B 3/0056
    See application file for complete search history.

(56) References Cited

U.S. PATENT DOCUMENTS

2012/0183288 A1    7/2012   Kishinami et al.
2017/0010473 A1*   1/2017   Ide ....................... G02B 3/0056

FOREIGN PATENT DOCUMENTS

CN        106164748        1/2019
WO      2019006684        1/2019

OTHER PUBLICATIONS

"Office Action of Taiwan Counterpart Application", dated Aug. 27, 2021, p. 1-p. 4.

* cited by examiner

*Primary Examiner* — Ryan D Howard
(74) *Attorney, Agent, or Firm* — JCIPRNET

(57) ABSTRACT

A light field near eye display device including a display element, a micro-lens array, a first lens, and a second lens is provided. The display element provides an image light beam. The micro-lens array is located on a transmission path of the image light beam, and has multiple micro-lenses. The first lens is located on the transmission path of the image light beam, where the micro-lens array is located between the first lens and the display element. The second lens is located on the transmission path of the image light beam, and located between the micro-lens array and the display element. The following formulas are satisfied:

$$\left|\frac{1}{f_{MLA}}\right| > \left|\frac{1}{f_1}\right|,$$

and $$\left|\frac{1}{f_{MLA}}\right| > \left|\frac{1}{f_2}\right|,$$

(Continued)

where $f_{MLA}$ is an equivalent focal length of the micro-lenses, $f_1$ is an equivalent focal length of the first lens, and $f_2$ is an equivalent focal length of the second lens.

10 Claims, 9 Drawing Sheets

LIGHT FIELD NEAR EYE DISPLAY DEVICE

CROSS-REFERENCE TO RELATED APPLICATION

This application claims the priority benefit of U.S. provisional application Ser. No. 62/950,109, filed on Dec. 19, 2019, and China application serial no. 202010679341.1, filed on Jul. 15, 2020. The entirety of each of the above-mentioned patent applications is hereby incorporated by reference herein and made a part of this specification.

BACKGROUND

Technical Field

The disclosure relates to a display device, and particularly relates to a light field near eye display device.

Description of Related Art

With the advancement of display technology and people's desire for high technology, near eye display (NED) and head-mounted display (HMD) are currently products with great development potential. In NED technology, since a light field near eye display (LFNED) has current light field information, it may solve the issue of vergence-accommodation conflict (VAC), and provide image information with depth information, and may be applied to augmented reality (AR) technology and virtual reality (VR) technology of the NED technology.

Generally, a spatial multiplexing LFNED adopts a display element such as a micro-LED display, a micro-OLED display, a liquid crystal display (LCD), etc., and transmits light field sub-images through optical elements such as a micro-lens array, so as to stack parallax images on retina, so that a user may view a light field image with depth information.

However, since the micro-lens array is a key element in the LFNED, imaging quality of the micro-lens array may affect an overall light field image quality. When a display angle is increased (or a field of view angle is increased), the micro-lens array cannot eliminate large-angle aberrations, which may cause blurred edge images. In order to solve the issue of large-angle aberrations, the number of the micro-lens arrays may be increased, but this will increase the system cost. Moreover, these micro-lens arrays need to be accurately aligned, which increases the difficulty of assembly.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY

The invention is directed to a light field near eye display device, which is capable of improving imaging quality of edge images.

Other objects and advantages of the invention may be further illustrated by the technical features broadly embodied and described as follows.

In order to achieve one or a portion of or all of the objects or other objects, an embodiment of the invention provides a light field near eye display device. The light field near eye display device includes a display element, a micro-lens array, a first lens, and a second lens. The display element is configured to provide an image light beam. The micro-lens array is located on a transmission path of the image light beam, and the micro-lens array includes a plurality of micro-lenses. The first lens is located on the transmission path of the image light beam, where the micro-lens array is located between the first lens and the display element. The second lens is located on the transmission path of the image light beam, where the second lens is located between the micro-lens array and the display element. The following formulas are satisfied:

$$\left|\frac{1}{f_{MLA}}\right| > \left|\frac{1}{f_1}\right|,$$

and $$\left|\frac{1}{f_{MLA}}\right| > \left|\frac{1}{f_2}\right|,$$

where $f_{MLA}$ is an equivalent focal length of the micro-lenses, $f_1$ is an equivalent focal length of the first lens, and $f_2$ is an equivalent focal length of the second lens.

Based on the above description, the embodiment of the invention has at least one of following advantages or effects. In the embodiment of the invention, the light field near eye display device may effectively eliminate edge aberrations and improve the edge imaging quality by disposing the second lens and configuring the focal length of each micro-lens on the micro-lens array to satisfy:

$$\left|\frac{1}{f_{MLA}}\right| > \left|\frac{1}{f_1}\right|,$$

and $$\left|\frac{1}{f_{MLA}}\right| > \left|\frac{1}{f_2}\right|,$$

where $f_{MLA}$ is an equivalent focal length of the micro-lenses, $f_1$ is an equivalent focal length of the first lens, and $f_2$ is an equivalent focal length of the second lens.

Other objectives, features and advantages of the present invention will be further understood from the further technological features disclosed by the embodiments of the present invention where there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
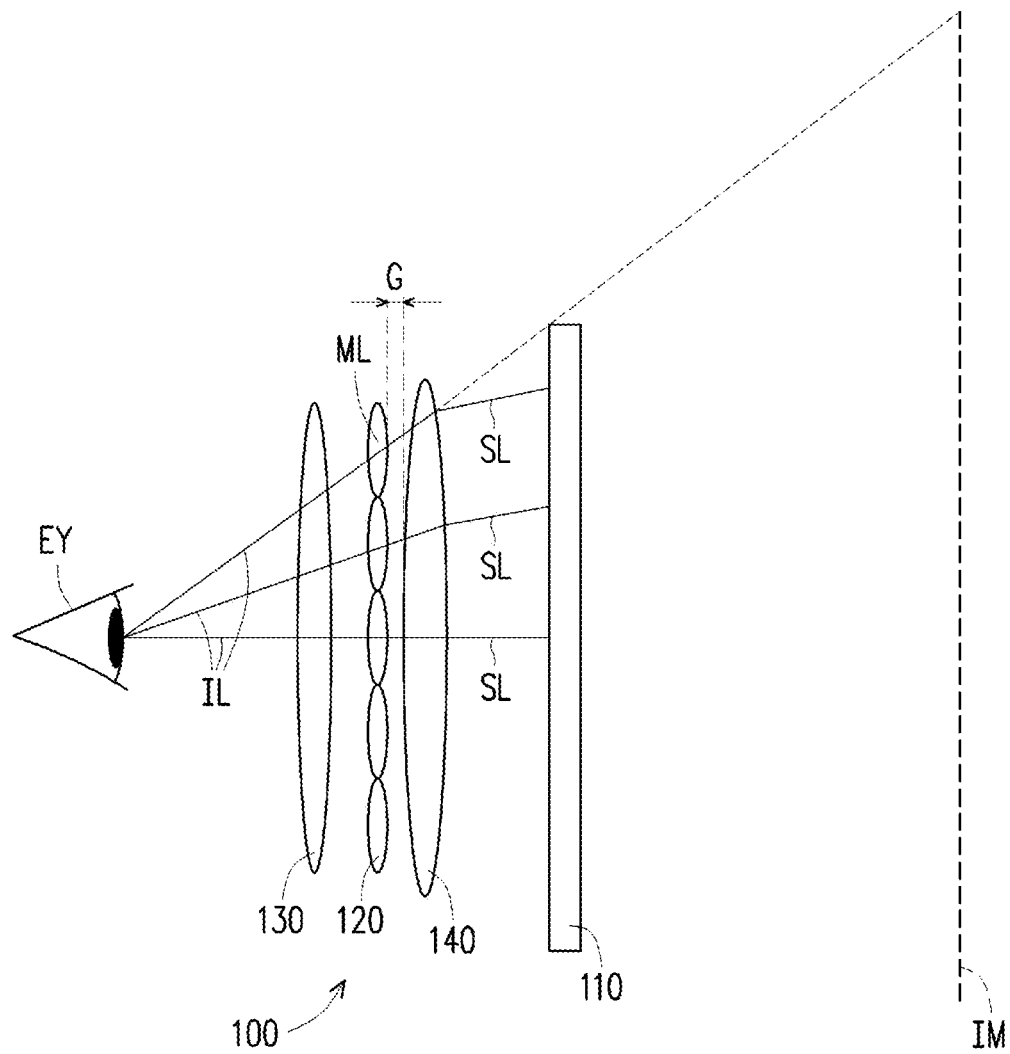
FIG. 1A is a schematic diagram of an optical arrangement of a light field near eye display device according to an embodiment of the invention.
Figure 1B:
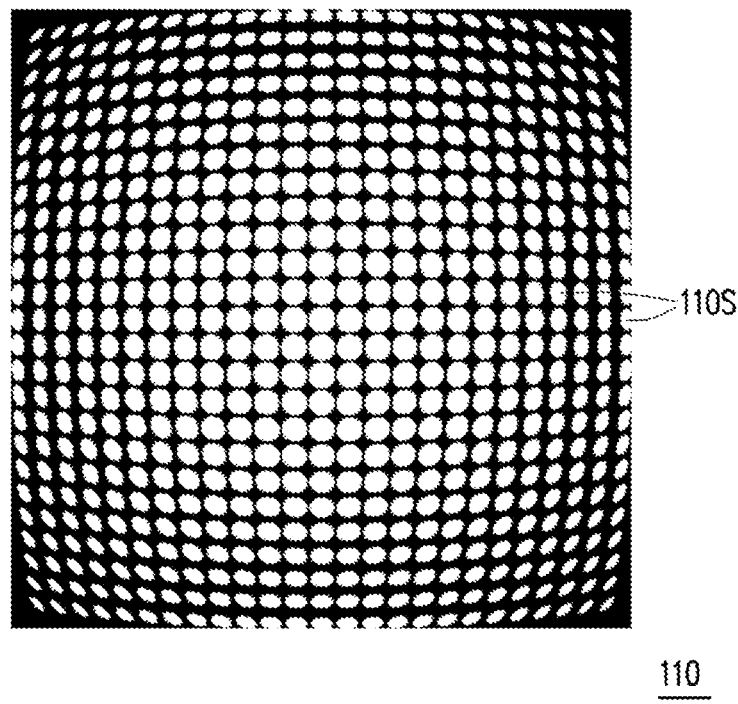
FIG. 1B is a schematic diagram of a display image of a display element of FIG. 1A.
Figure 1C:
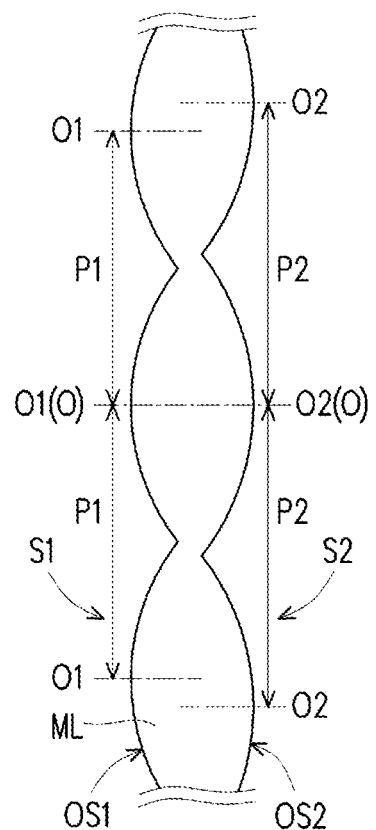
FIG. 1C is a schematic side view of a micro-lens array of FIG. 1A.

FIG. 1A is a schematic diagram of an optical arrangement of a light field near eye display device according to an embodiment of the invention. FIG. 1B is a schematic diagram of a display image of a display element of FIG. 1A. FIG. 1C is a schematic side view of a micro-lens array of FIG. 1A. Referring to FIG. 1A, in the embodiment, a light field near eye display device 100 is arranged in front of at least one eye EY of a user. The light field near eye display device 100 includes a display element 110, a micro-lens array 120, a first lens 130 and a second lens 140. For example, the display element 110 is a light field display, and may be a display such as a micro-LED display, a micro-OLED display, a liquid crystal display (LCD), etc. In addition, in the embodiment, the first lens 130 may be, for example, a biconvex lens, and the second lens 140 may be, for example, a plano-convex lens or a biconvex lens. Furthermore, the first lens 130 and the second lens 140 may be aspherical lenses, and refractive indexes of the first lens 130 and the second lens 140 may be between 1.4 and 1.9, and Abbe numbers of the first lens 130 and the second lens 140 may be greater than 20.

To be specific, as shown in FIG. 1A and FIG. 1B, in the embodiment, the display element 110 may provide an image light beam IL. In detail, the display element 110 displays a plurality of sub-display images 110S to respectively provide a plurality of sub-image light beams SL, and the sub-image light beams SL form the image light beam IL. In addition, the sub-image light beams SL of the image light beam IL have current light field information, which may achieve a post-focusing function, and thereby providing image information with depth information, and may be stacked on user's retina through optical elements to form a parallax image, so that the user may view a light field image IM with the depth information, but the invention is not limited thereto.

To be specific, as shown in FIG. 1A, in the embodiment, the second lens 140, the micro-lens array 120, and the first lens 130 are sequentially located on a transmission path of the image light beam IL, and the micro-lens array 120 is located between the first lens 130 and the display element 110, and the second lens 140 is located between the micro-lens array 120 and the display element 110. To be specific, as shown in FIG. 1A, a gap G between the second lens 140 and the micro-lens array 120 (for example, the smallest distance there between) is less than 0.2 mm, for example, the second lens 140 may directly contact the micro-lens array 120, which means that there is no other optical element between the second lens 140 and the micro-lens array 120, but the invention is not limited thereto. In other embodiments, in order to avoid friction damage to the lenses, the gap G between the second lens 140 and the micro-lens array 120 may be 0.1 mm to 0.2 mm, which means that there is a tiny distance between the second lens 140 and the micro-lens array 120, and no other optical element is provided there between. Moreover, as shown in FIG. 1A, the sub-image light beams SL of the image light beam IL sequentially pass through the second lens 140, the micro-lens array 120, and the first lens 130. Therefore, the image formed by each sub-image beam SL passing through the second lens 140, the micro-lens array 120, and the first lens 130 is a virtual image, and no light field image of real image is generated.

Further, as shown in FIG. 1A and FIG. 1C, the micro-lens array 120 has a first surface S1 and a second surface S2, the first surface S1 faces the first lens 130, the second surface S2 faces the second lens 140, and the micro-lens array 120 has a plurality of micro-lenses ML. Each micro-lens ML has a first optical surface OS1 and a second optical surface OS2.

The first optical surface OS1 of each micro-lens ML forms the first surface S1, and the second optical surface OS2 of each micro-lens ML forms the second surface S2.

Further, as shown in FIG. 1A, a path of the sub-image light beam SL along an optical axis at a center of the micro-lens array 120 is different from a path of the sub-image light beam SL at an off-axis edge of the micro-lens array 120. Therefore, in the embodiment, in order to eliminate aberrations caused by different sub-image light beam paths, curvatures or a width (pitch) of the first optical surface OS1 and the second optical surface OS2 of each micro-lens ML on the micro-lens array 120 may be different. Namely, a focal length of each micro-lens ML on the micro-lens array 120 may be different along with a different position. For example, in the embodiment, the focal length of the micro-lens ML at a center position of the micro-lens array 120 is smaller than the focal length of the micro-lens ML at an edge position of the micro-lens array 120, or a curvature of the micro-lens ML at the center position of the micro-lens array 120 is smaller than that of the micro-lens ML at the edge position of the micro-lens array 120, but the invention is not limited thereto.

To be specific, as shown in FIG. 1C, a center O1 of the first optical surface OS1 and a center O2 of the second optical surface OS2 of the micro-lens ML located at a most center O of the micro-lens array 120 are overlapped. The center O1 of the first optical surface OS1 of each micro-lens ML has a first pitch P1 from the center O1 of the first optical surface OS1 of the closest micro-lens ML, and the center O2 of the second optical surface OS2 of each micro-lens ML O2 has a second pitch P2 from the center O2 of the second optical surface OS2 of the closest micro-lens ML. The first pitches P1 are the same with each other, and the second pitches P2 are the same with each other but the first pitch P1 and the second pitch P2 are different. In the embodiment, the first pitch P1 is smaller than the second pitch P2.

To be more specific, since each micro-lens ML on the micro-lens array 120 has a thickness, and a focal point of each micro-lens ML is located between the micro-lens ML and the display element 110, the first pitch P1 and the second pitch P2 may be set to be different, so that each sub-image light beam SL may pass through the corresponding micro-lens ML on the micro-lens array 120, and each sub-image light beam SL incident from the second surface S2 may be emitted out from the first surface S1 without vignetting. Moreover, since each sub-image light beam SL incident from the second surface S2 travels toward the center of the micro-lens array 120 and is then emitted out from the first surface S1, the first pitch P1 provided on the first optical surface OS1 is smaller than the second pitch P2 provided on the second optical surface OS2. Particularly, in the embodiment, the curvatures of the first optical surface OS1 and the second optical surface OS2 of the micro-lens ML are the same, but in other embodiments, the curvatures of the first optical surface OS1 and the second optical surface OS2 may be different.

Further, the focal length of each micro-lens ML of the micro-lens array 120 satisfies:

$$\left|\frac{1}{f_{MLA}}\right| > \left|\frac{1}{f_1}\right|,$$

and $$\left|\frac{1}{f_{MLA}}\right| > \left|\frac{1}{f_2}\right|,$$

where $f_{MLA}$ is an equivalent focal length of the micro-lenses ML, $f_1$ is an equivalent focal length of the first lens 130, and $f_2$ is an equivalent focal length of the second lens 140. In this way, through the arrangement of the first lens 130, the micro-lens array 120 and the second lens 140, the light field near eye display device 100 may adjust related optical parameters of different optical elements to further reduce aberrations and improve the imaging quality of the edge images. Moreover, in the embodiment, the image light beam IL passing through the second lens 140, the micro-lens array 120, and the first lens 130 is not converged into a real image, and the second lens 140 may be arranged next to the micro-lens array 120 (for example, in direct contact or with a small gap), a thickness of an optical engine may be reduced, which avails miniaturization of the light field near eye display device 100.

Further descriptions are made below with reference of FIG. 2A to FIG. 3B.

Figure 2A:
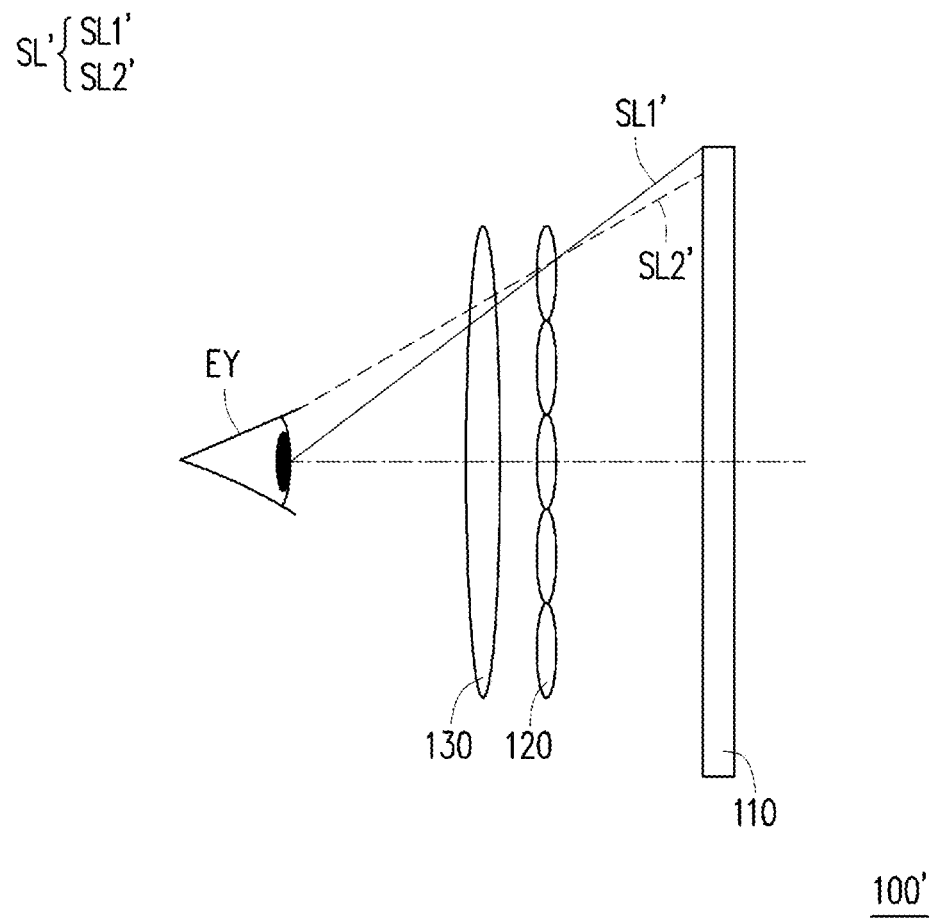
FIG. 2A is a schematic diagram of different light paths of a light field near eye display device of a comparative example.
Figure 2B:
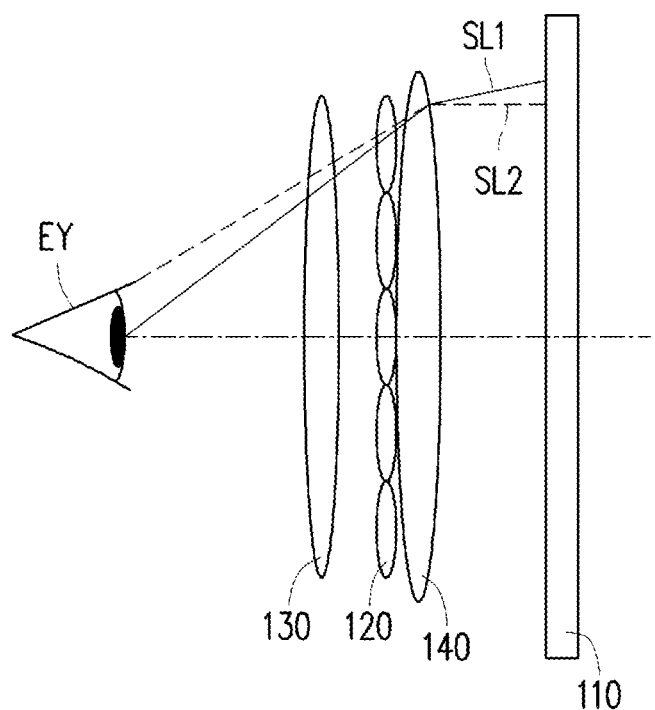
FIG. 2B is a schematic diagram of different light paths of the light field near eye display device of FIG. 1A.
Figure 3A:
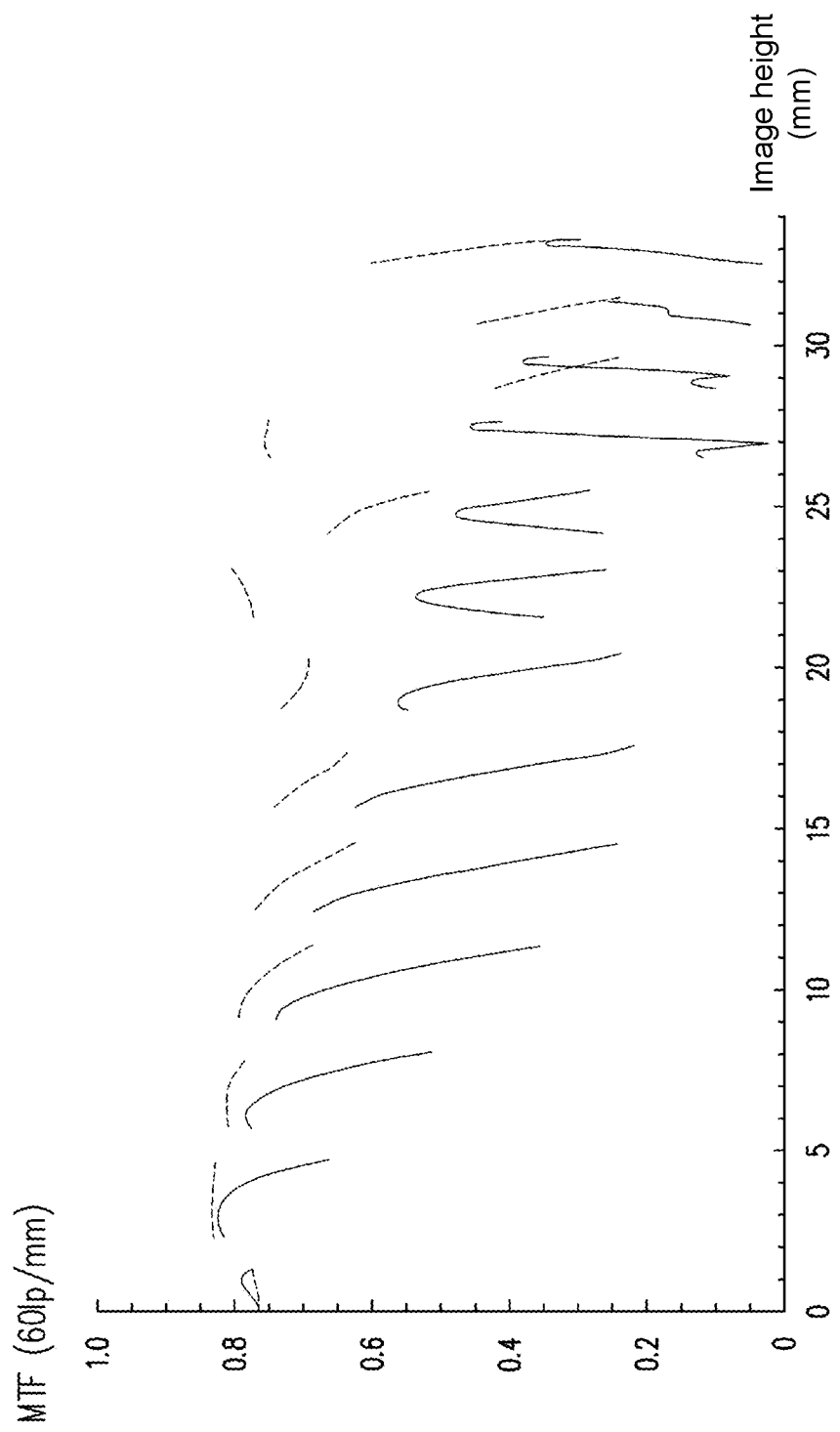
FIG. 3A is a diagram of modulation transfer functions of a plurality of sub-images of the light field near eye display device of FIG. 2A.
Figure 3B:
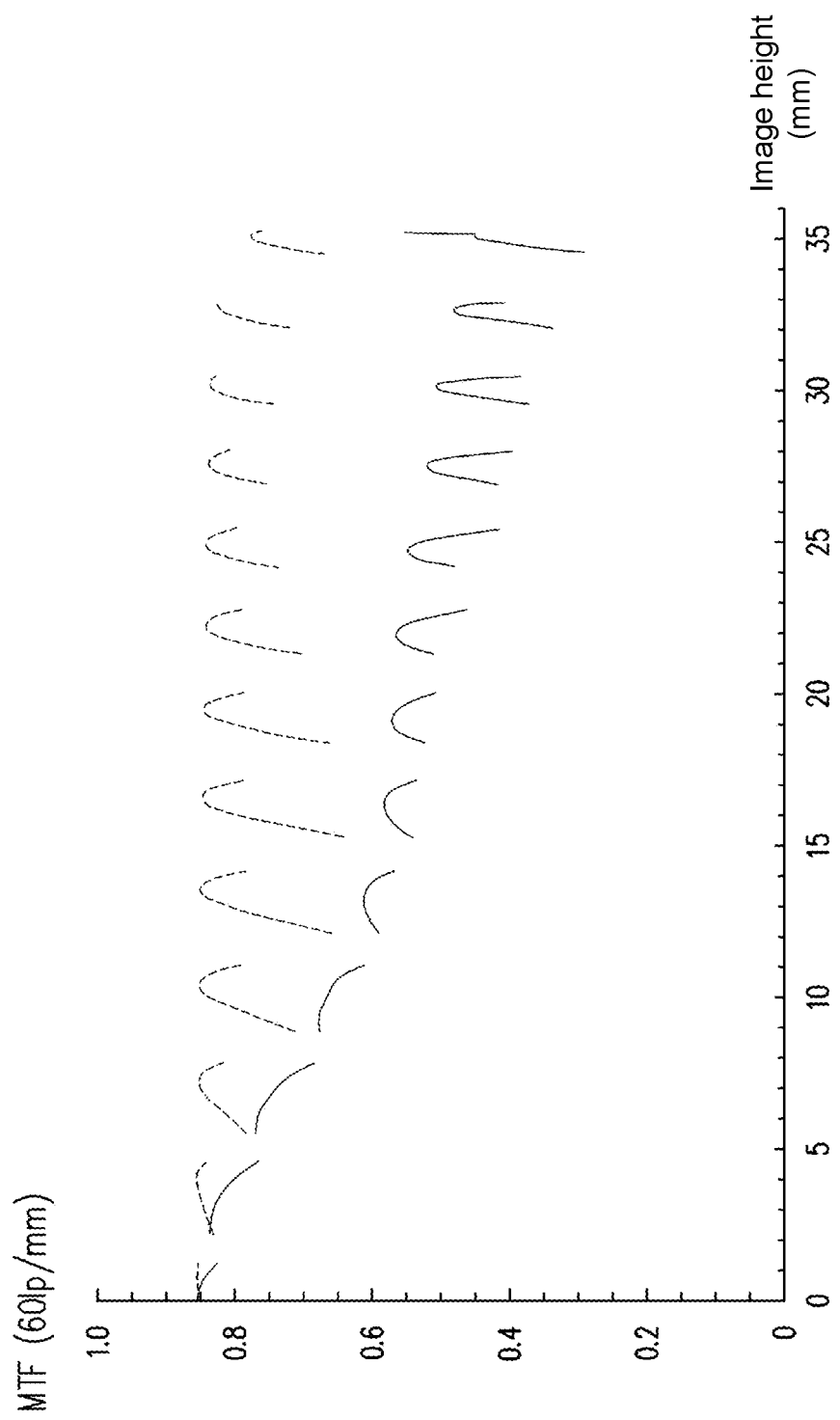
FIG. 3B is a diagram of modulation transfer functions of a plurality of sub-images of the light field near eye display device of FIG. 1A.

FIG. 2A is a schematic diagram of different light paths of a light field near eye display device of a comparative example. FIG. 2B is a schematic diagram of different light paths of a light field near eye display device according to an embodiment of the invention. FIG. 3A is a diagram of modulation transfer functions of an image light beam of the light field near eye display device of FIG. 2A. FIG. 3B is a diagram of modulation transfer functions of an image light beam of a light field near eye display device according to an embodiment of the invention. Referring to FIG. 2A, a light field near eye display device 100' of the comparative example is similar to the light field near eye display device 100 of FIG. 2B, and a difference there between is that the light field near eye display device 100' of the comparative example of FIG. 2A does not include the second lens 140 of the embodiment of FIG. 2B. Further, as shown in FIG. 2A and FIG. 2B, in the light field near eye display device 100 of FIG. 2B, through the arrangement of the second lens 140, the sub-image light beam SL provided by the display element 110 may have a larger field of view angle. On the contrary, as shown in FIG. 2A, if the second lens 140 is not provided, the display element 110 needs to extend its edge region in order to provide the sub-image light beam SL' with the same field of view angle. Namely, the sub-image light beam SL' provided by the light field near eye display device 100' of the comparative example of FIG. 2A cannot display the light field sub-image of the largest viewing angle region that may be displayed by the light field near eye display device 100 of FIG. 2B. Therefore, the light field near eye display device 100 of FIG. 2B may provide images with a larger field of view angle, and may also increase a usage rate of the display element 110.

On the other hand, as shown in FIG. 2A and FIG. 2B, in the light field near eye display device 100, a light beam SL1 (SL1') and a light beam SL2 (SL2') respectively represent the highest and lowest positions of the sub-image light beam SL (SL') of one sub-display image 110S (shown in FIG. 1B) of the display element 110, and the more the sub-display image 110S is closer to the edge of the display element 110, the greater an optical path difference between the light beam SL1 and the light beam SL2 of the provided sub-image light beam SL is, and the larger the formed aberration is. According to FIG. 2A and FIG. 2B, it is known that an optical path difference between the light beam SL1' and the light beam SL2' of the sub-image light beam SL' of the light field near eye display device 100' of the comparative example near the edge of the display element 110 is greater than the optical path difference between the light beam SL1 and the light beam SL2 of the sub-image light beam SL of the light field near eye display device 100 near the edge of the display element 110, so that the aberration of the light field near eye display device 100' is greater than that of the light field near eye display device 100. In other words, through the arrangement of the second lens 140, the aberrations of the sub-image light beams SL provided by the sub-display images 110S near the edge of the display element 110 may be corrected, thereby improving the imaging quality of the edge images.

Further, as shown in FIG. 3A and FIG. 3B, FIG. 3A and FIG. 3B respectively illustrate variations of modulation transfer function (MTF) curves of the edge sub-images provided by the light field near eye display device 100' of the comparative example of FIG. 2A and the light field near eye display device 100 of FIG. 2B when a diagonal field of view angle is ±53°. In FIG. 3A and FIG. 3B, x-coordinates represent positions of light field sub-images formed by each of the sub-image light beams SL provided by the display element 110, and the farther away the x-coordinate is from the origin, the farther the position of the light field sub-image is from the center, and y-coordinates represent MTF values. Therefore, in the figures, the MTF value of each corresponding light field sub-image may be presented, and the y-coordinate is normalization performed when the MTF value is 60 lp/mm, and a meaning of the MTF value being 60 lp/mm is that an image resolution thereof has an imaging density that 60 pairs of black and white lines per millimeter may be clearly identified in imaging, and a unit thereof is contrast, the smaller the value is, the smaller the contrast is, where dotted line represent the MTF value of each corresponding light field sub-image in a sagittal direction, and solid line represents the MTF value of each corresponding light field sub-image in a tangential direction.

As shown in FIG. 3A, the MTF value of the edge sub-image provided by the light field near eye display device 100' of the comparative example correspondingly decreases as the position of the correspondingly formed light field sub-image is farther from the center. Taking the sagittal direction as an example, except that a few light field sub-images located near the center have the MTF values greater than 0.6, the other light field sub-images have gradually decreased MTF values along with farther distances from the center. In contrast, as shown in FIG. 3B, the light field near eye display device 100 of the embodiment may increase the MTF values of the light field sub-images located far away from the center in the sagittal direction to be greater than 0.6. Namely, through the arrangement of the second lens 140, the light field near eye display device 100 may effectively eliminate the edge aberrations and improve the edge imaging quality.

Figure 4:
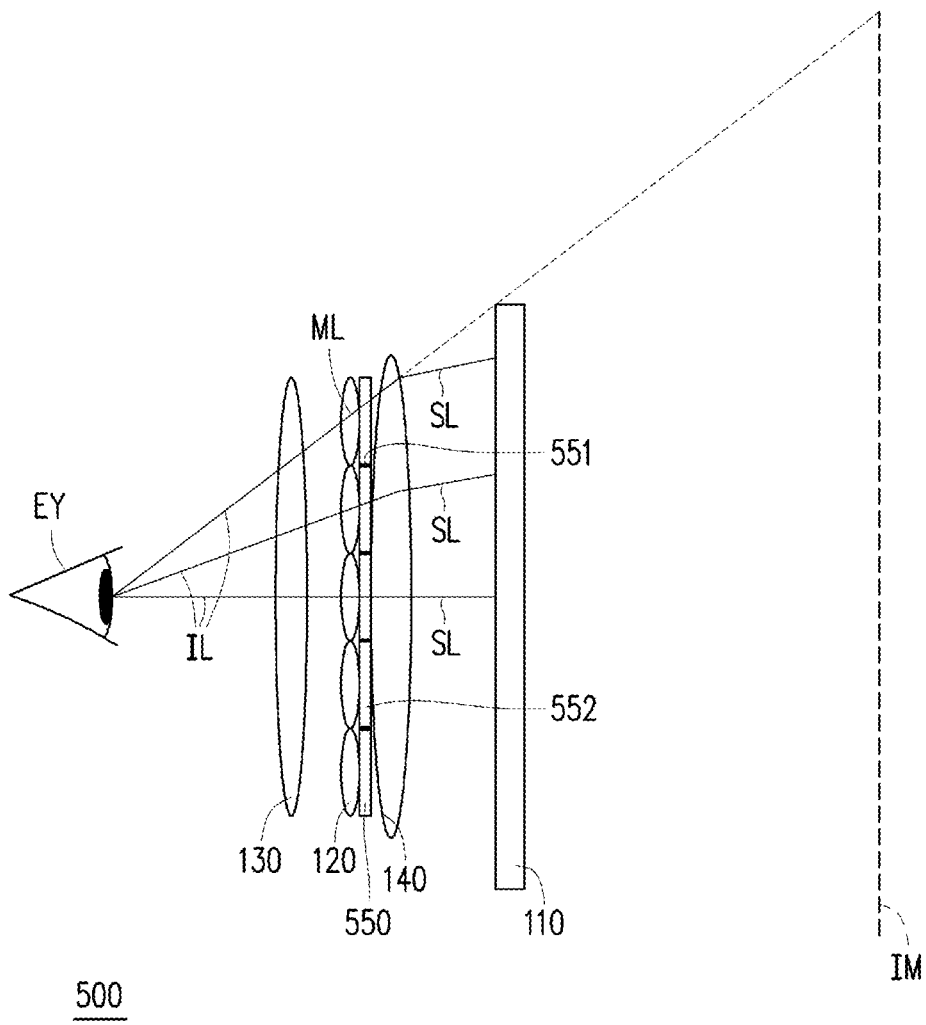
FIG. 4 is a schematic diagram of an optical arrangement of a light field near eye display device according to another embodiment of the invention.

FIG. 4 is a schematic diagram of an optical arrangement of a light field near eye display device according to another embodiment of the invention. Referring to FIG. 1A and FIG. 4, a light field near eye display device 500 is similar to the light field near eye display device 100 of FIG. 1A, and a difference there between is that the light field near eye display device 500 further includes a light-shielding element 550. The light-shielding element 550 is located between the second lens 140 and the micro-lens array 120. The light-shielding element 550 has a plurality of light-shielding regions 551 and a plurality of light-transmitting regions 552, where each light-transmitting region 552 is arranged corresponding to each micro-lens ML (for example, corresponding to each second optical surface OS2, as shown in FIG. 1C) and is used for transmitting each of the sub-image light beams SL, and the light-shielding regions 551 are arranged to shield stray light, i.e., each of the light-shielding regions 551 is correspondingly arranged between the micro-lenses ML (for example, corresponding to a recess of the second surface S2 of the micro-lens array 120). To be specific, the light-shielding element 550, for example, includes a transparent substrate (not shown) and a light-shielding layer disposed on the transparent substrate, where the light-shielding layer forms the plurality of the light-shielding regions 551, and the plurality of the light-transmitting regions 552 are formed between the light-shielding region 551. An orthogonal projection of each micro-lens ML (for example, each second optical surface OS2) on the light-shielding element 550 is overlapped with each light-transmitting region 552, and an orthogonal projection of each recess of the second surface S2 of the micro-lens array 120 on the light-shielding element 550 is overlapped with each light-shielding region 551, but the invention is not limited thereto. Further, as shown in FIG. 4, in the embodiment, one side of the light-shielding element 550 is in direct contact with the second lens 140 (or there is a small gap, such as 0.1 mm-0.2 mm there between), and the other side of the light-shielding element 550 is in direct contact with the micro-lens array 120 (or there is a small gap, such as 0.1 mm-0.2 mm there between). In other words, the second lens 140, the micro-lens array 120, and the light-shielding element 550 may closely contact each other. In this way, the thickness of the optical engine may be further reduced, which avails miniaturization of the light field near eye display device 500, but the invention is not limited thereto. In another embodiment, the light-shielding regions 551 of the light-shielding element 550 may be a shielding layer disposed on the second surface S2 of the micro-lens array 120 and located between the micro-lenses ML to form a part of the micro-lens array 120, which avails the miniaturization of the light field near eye display device 500.

To be specific, as shown in FIG. 4, in the embodiment, by disposing the second lens 140 and configuring the focal length of each micro-lens ML on the micro-lens array 120 to satisfy:

$$\left|\frac{1}{f_{MLA}}\right| > \left|\frac{1}{f_1}\right|,$$

and $$\left|\frac{1}{f_{MLA}}\right| > \left|\frac{1}{f_2}\right|,$$

where $f_{MLA}$ is an equivalent focal length of the micro-lenses ML, $f_1$ is an equivalent focal length of the first lens 130, and $f_2$ is an equivalent focal length of the second lens 140, the light field near eye display device 500 may effectively eliminate the edge aberrations, and improve the edge imaging quality, and the similar effects and advantages of the aforementioned light field near eye display device 100 may also be achieved, which is repeated.

Figure 5:
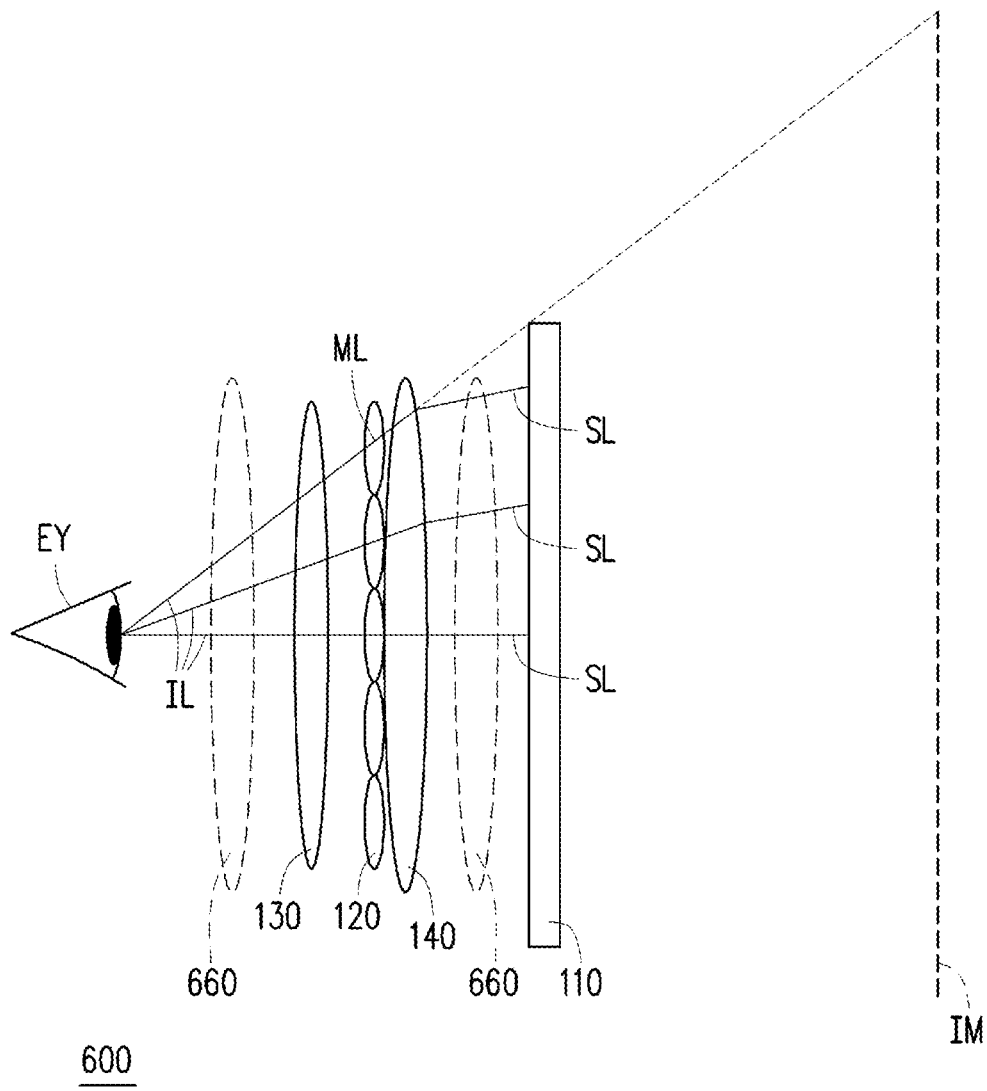
FIG. 5 is a schematic diagram of an optical arrangement of a light field near eye display device according to still another embodiment of the invention.

FIG. 5 is a schematic diagram of an optical arrangement of a light field near eye display device according to still another embodiment of the invention. Referring to FIG. 5, a light field near eye display device 600 is similar to the light field near eye display device 100 of FIG. 1A, and a difference there between is as follows. In the embodiment, the light field near eye display device 600 further includes a third lens 660, where the third lens 660 is located between the second lens 140 and the display element 110, or the first lens 130 may be located between the third lens 660 and the micro-lens array 120. More specifically, when the third lens 660 is located between the second lens 140 and the display element 110, the light field near eye display device may further eliminate the edge aberrations and improve the edge imaging quality through the arrangement of the third lens 660.

Moreover, by disposing the second lens 140 and configuring the focal length of each micro-lens ML on the micro-lens array 120 to satisfy:

$$\left|\frac{1}{f_{MLA}}\right| > \left|\frac{1}{f_1}\right|,$$

and $$\left|\frac{1}{f_{MLA}}\right| > \left|\frac{1}{f_2}\right|,$$

where $f_{MLA}$ is an equivalent focal length of the micro-lenses ML, $f_1$ is an equivalent focal length of the first lens 130, and $f_2$ is an equivalent focal length of the second lens 140, the light field near eye display device 600 may effectively eliminate the edge aberrations, and improve the edge imaging quality, and the similar effects and advantages of the aforementioned light field near eye display device 100 may also be achieved, which is repeated.

In summary, the embodiments of the invention have at least one of following advantages or effects. In the embodiments of the invention, the light field near eye display device may effectively eliminate edge aberrations and improve the edge imaging quality by disposing the second lens and configuring the focal length of each micro-lens on the micro-lens array to satisfy:

$$\left|\frac{1}{f_{MLA}}\right| > \left|\frac{1}{f_1}\right|,$$

and $$\left|\frac{1}{f_{MLA}}\right| > \left|\frac{1}{f_2}\right|,$$

where $f_{MLA}$ is an equivalent focal length of the micro-lenses, $f_1$ is an equivalent focal length of the first lens, and $f_2$ is an equivalent focal length of the second lens.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A light field near eye display device comprising a display element, a micro-lens array, a first lens, and a second lens, wherein
    the display element is configured to provide an image light beam,
    the micro-lens array is located on a transmission path of the image light beam, and the micro-lens array comprises a plurality of micro-lenses,
    the first lens is located on the transmission path of the image light beam, wherein the micro-lens array is located between the first lens and the display element, and
    the second lens is located on the transmission path of the image light beam, wherein the second lens is located between the micro-lens array and the display element, and the following formulas are satisfied:

$$\left|\frac{1}{f_{MLA}}\right| > \left|\frac{1}{f_1}\right|,$$

and $$\left|\frac{1}{f_{MLA}}\right| > \left|\frac{1}{f_2}\right|,$$

where $f_{MLA}$ is an equivalent focal length of the micro-lenses, $f_1$ is an equivalent focal length of the first lens, and $f_2$ is an equivalent focal length of the second lens.

2. The light field near eye display device as claimed in claim 1, wherein the first lens is a biconvex lens, and the second lens is a plano-convex lens or a biconvex lens.

3. The light field near eye display device as claimed in claim 1, wherein the first lens and the second lens are aspherical lenses.

4. The light field near eye display device as claimed in claim 1, wherein a gap between the second lens and the micro-lens array is less than 0.2 mm.

5. The light field near eye display device as claimed in claim 1, wherein the image light beam sequentially passes through the second lens, the micro-lens array, and the first lens, and on the transmission path that the image light beam passes through the second lens, the micro-lens array, and the first lens, the image light beam is not converged into a real image.

6. The light field near eye display device as claimed in claim 1, wherein the micro-lens array has a first surface and a second surface, the first surface faces the first lens, and the second surface faces the second lens, each of the micro-lenses has a first optical surface and a second optical surface, the first optical surface of each of the micro-lenses forms the first surface, and the second optical surface of each of the micro-lenses forms the second surface, and a center of the first optical surface of each of the micro-lenses has a first pitch from a center of the first optical surface of the closest micro-lens, and a center of the second optical surface of each of the micro-lenses has a second pitch from a center of the second optical surface of the closest micro-lens, wherein the first pitch is smaller than the second pitch.

7. The light field near eye display device as claimed in claim 1, wherein a focal length of the micro-lens located at a center position of the micro-lens array among the plurality of micro-lenses is smaller than a focal length of the micro-lens located at an edge position of the micro-lens array.

8. The light field near eye display device as claimed in claim 1, further comprising:
a light-shielding element located between the second lens and the micro-lens array, wherein a gap between one side of the light-shielding element and the second lens is less than 0.2 mm, and a gap between the other side of the light-shielding element and the micro-lens array is less than 0.2 mm.

9. The light field near eye display device as claimed in claim 1, wherein the micro-lens array has a first surface and a second surface, the first surface faces the first lens, and the second surface faces the second lens, the light field near eye display device further comprising:
a light-shielding element disposed on the second surface of the micro-lens array and located between the plurality of micro-lenses.

10. The light field near eye display device as claimed in claim 1, further comprising:
a third lens, wherein the first lens is located between the third lens and the micro-lens array, or the third lens is located between the second lens and the display element.

* * * * *